Aug. 24, 1948.                    C. H. FAY                    2,447,849
                                MAGNETOMETER
                            Filed Dec. 26, 1944

Inventor: Charles H. Fay
By his Attorney:

Patented Aug. 24, 1948

2,447,849

UNITED STATES PATENT OFFICE 2,447,849

MAGNETOMETER

Charles H. Fay, Houston, Tex., assignor to Shell Development Company, San Francisco, Calif., a corporation of Delaware Application December 26, 1944, Serial No. 569,819

3 Claims. (Cl. 175—183)

This invention pertains to the art of magnetic exploration, and relates more specifically to instruments for the measurement of magnetic fields. Such measurements are of great value in prospecting for magnetic ores, locating buried iron pipes, and other objects; they have been used successfully in petroleum exploration, where certain types of oil-bearing structures are known to show magnetic anomalies.

In my copending application, Ser. No. 514,581, filed December 15, 1943, now Patent No. 2,425,180, of which the present application is a continuation in part, directed to an "Instrument for measuring magnetic field intensities," I have disclosed a device for measuring magnetic fields, said device comprising a vibrator coil, an optical system and photocell arranged to translate oscillation of said vibrator into a voltage which varies in sympathy therewith, an amplifier to amplify said voltage, said amplifier being provided with manual or automatic gain control, said amplifier driving the vibrator, so that said device constitutes a feedback oscillator when said vibrator is properly oriented with respect to the magnetic field component it is desired to measure, the amplifier gain required just to allow oscillation being inversely proportional to said magnetic field component and hence a measure of said component when suitably calibrated. While the aforesaid device is extremely useful, its possible precision may in some cases be limited by the difficulty in keeping the intensity of the light source and the amplifier operating conditions constant, since a certain percent change in overall gain will introduce approximately that percent error in the magnetic field determination.

It is therefore the object of the present invention to provide a method and an apparatus substantially free of the difficulty above mentioned, as will be seen from the following description taken with reference to the attached drawing, wherein.

It will be shown in the description that the invention provides a highly precise magnetic method for use in geophysical prospecting, for example in the measurement of differences in vertical field with an accuracy to within one gamma ($10^{-5}$ oersted), suitable leveling means being employed. It is therefore convenient to describe the invention as applied to the measurement of the earth's vertical field. Nothing in the description, however, is intended to limit the use of the invention to this purpose.

Figure 1:
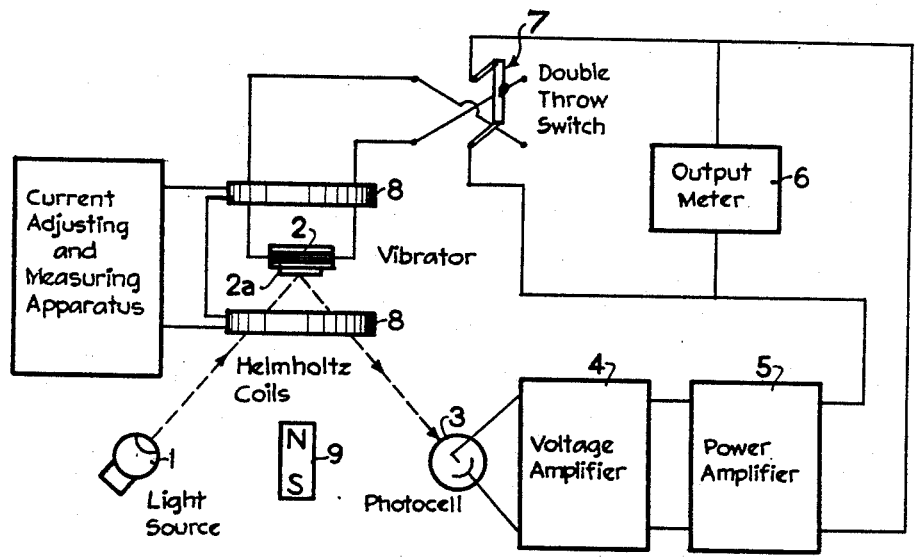
Fig. 1 is a diagram of an embodiment of the invention, suitable for precise measurement of magnetic fields.

Referring to Fig. 1, a light source 1, either provided with special prism and lens means forming a light train or containing its own lens, as shown in the drawing for simplicity, serves to throw a beam of light on the mirror 2a of vibrator 2, which is made in a manner similar to the construction of taut suspension oscillograph galvanometers, as described in said copending application Serial No. 514,581. The angular displacement of vibrator 2 is thus made to cause a change of illumination of photocell 3, on which said beam is reflected by the mirror 2a, and consequently a change in photocell current and in voltage across the photocell load resistance in amplifier 4, which voltage is highly amplified by the electronic circuit comprising said photocell, amplifier 4 and power amplifier 5, which is connected by means of the reversing switch 7 to the vibrator. The initial displacement of the vibrator coil occurs automatically, for example, due to a mechanical oscillation thereof caused by any displacement or vibration of the instrument. The amplifiers are designed to have a total phase shift of approximately 90 electrical degrees at the mechanical resonance frequency of the vibrator. When the vibrator is in a magnetic field having a sufficiently large component of the proper sense in the plane of the vibrator normal to its axis the part of the system so far described constitutes a feedback oscillator, being essentially the system described in my copending application previously referred to herein. Instead of varying the gain of the amplifier, however, as there disclosed, the total field component acting on vibrator 2 is reduced by superposing on the field being measured, for example the earth's vertical field, an artificial opposing field produced for example by direct current passed in a set of Helmholtz coils 8 arranged about the coil 2, this direct current being supplied, adjusted and measured by devices 9 familiar to those skilled in the art of electrical measurement, and similar, for instance, to those shown at 105–109 in Fig. 2.

Now it has been found possible to make the amplifier gain sufficient to make the smallest field sufficient for oscillation of the order of 10 gammas ($10^{-5}$ oersted) or less, the lower limit being set apparently by seismic disturbance rather than by "shot noise" of the photocell or other statistical fluctuation noise effects.

To measure the external field component affecting the vibrator it is therefore necessary only to adjust the Helmholtz current until the system just oscillates at the undamped mechanical resonance frequency of the coil, as indicated by output meter 6, and then to measure this Helmholtz current. The reversing switch 7 may now be operated and the Helmholtz current readjusted to give oscillation with the same output meter reading, and the current again measured. The average of the two current measurements is multiplied by the Helmholtz coil constant to give the desired value of the field being measured. The field in which the system just oscillates may be also determined, if desired, by multiplying half the difference of the two current measurements by the Helmholtz coil constant.

The present invention is further adapted, as will be explained with reference to Fig. 2, to automatic adjustment of the Helmholtz coil current, affording the possibility of remote observation of changes in said current if desired, that is, the possibility of setting up the indicating or recording galvanometer at a distance from the rest of the apparatus, to which it may be connected, for example by means of a two-wire line.

Figure 2:
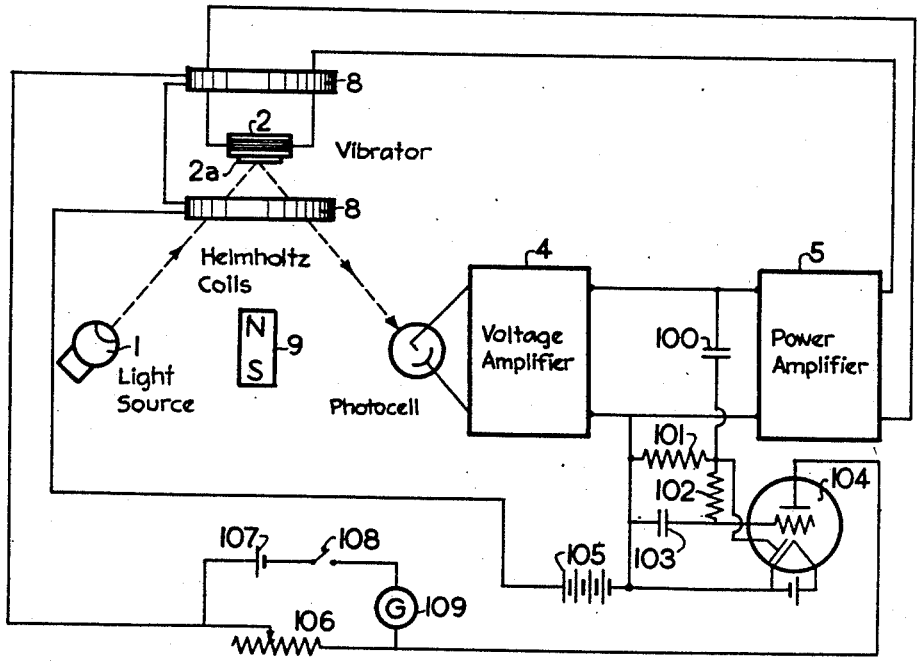
Fig. 2 is a diagram of another modification of the invention, suitable for operation as a magnetic variometer, and, as will be seen, easily adaptable to remote recording, elements identical to those of Fig. 1 being indicated by the same numerals.

In the modification of my invention diagrammatically shown in Fig. 2, vibrator 2 is so connected as to make the feedback regenerative when the total vertical field component is opposite in direction to the earth's vertical field component, that is, when the Helmholtz vertical field component is larger than the earth's vertical field component. The power amplifier 4 is, besides being coupled to power amplifier 5 as before, also coupled by condenser 100 to the diode section of a diode-triode electronic tube 104, wherein the diode section has a load resistance 101 and the triode section has a plate voltage supply 105. It is understood that a separate diode and triode, or any other suitable combination of tubes, such as a diode and a pentode, may be employed as will be evident to those skilled in the art. The negative D. C. voltage created by rectification of the signal applied to the diode is applied to the triode grid of tube 104 through a low pass filter consisting of resistor 102 and condenser 103, said filter serving to reduce the alternating component of said diode voltage to a negligible value. The negative voltage thus applied to the grid serves to reduce the plate current of tube 104, which is the current supplied to the Helmholtz coils, until the total vertical field component in which vibrator 2 operates is reduced to a small value and the system oscillates without amplifier overloading at the amplitude required to supply the required signal to the diode. As long as the required Helmholtz current can be supplied to give an amplitude of coil oscillation for which the amplifiers are linear, the total field component in which the vibrator operates will be independent of the field being measured; that is, the Helmholtz field will exceed the measured field by a small constant value, said value being, for example, of the order of 10 gammas. A ten percent change in light intensity or in overall amplifier gain would change said value by ten percent, thus giving a change of the order of only one gamma. Thus, said value having been once measured in the manner previously described with reference to Fig. 1, it may be subtracted from the value of the Helmholtz field as computed from the measured value of the Helmholtz current to determine the value of the earth's vertical field, with little possibility of significant error as long as reasonable constancy of light intensity and amplifier gain is maintained. Said Helmholtz current may conveniently be measured by means of a dial box or other precision variable resistance 106, a standard cell 107, a key 108, and sensitive galvanometer 109, it being understood that said galvanometer and associated apparatus can be placed at a sufficient distance from vibrator 2 to eliminate error from the stray field of the permanent magnet of galvanometer 109. Resistance 106 is adjusted until the galvanometer deflection is zero when key 108 is closed; the Helmholtz current is then computed from the ratio of the electromotive force of the standard cell to the value of resistance 106.

If the instrument is to be used as a variometer in geophysical prospecting, it may be more convenient to use resistor 106 to adjust the galvanometer reading to zero at the base station, and to employ readings of the galvanometer deflection at other stations as a measure of the variation of the vertical field at said stations from that at the base station. Such procedure eliminates the necessity for precise knowledge of the resistance of resistor 106, the electromotive force of cell 107, and of the Helmholtz coil constant, a knowledge of said constant to within a few percent being adequate for the purpose.

The instrument may similarly be used as a station variometer, means for recording the deflection of galvanometer 109 being provided, for example, by constructing the galvanometer coil 109 as recording mirror galvanometer. It is understood that cell 107 must be capable of continuously furnishing the small currents involved. Said instrument obviously permits recording at a location remote from the location of measurement; this is of advantage in certain applications.

In the use of the instrument as a variometer it may be desirable to employ a permanent magnet 9 to annul almost all of the field being measured. This has the advantage of reducing the range of Helmholtz field required to the order of the variation in vertical field to be observed, with a consequent reduction in the necessary precision of Helmholtz coil current measurement, and in the required sensitivity of the current measuring device.

I claim as my invention:

1. A system for magnetic field measurements, comprising a coil, means pivoting said coil for oscillation in said field, a light source, a photoelectric element, optical means carried by the coil for varying the illumination of the photo-electric element by the light source proportionally to the oscillation of the coil, amplifier means energized by the output of the photo-electric element, rectifier means in circuit with the amplifier means for rectifying a portion of the output current of said amplifier means, Helmholtz coil means energized by the direct current output of said rectifier means for neutralizing the magnetic field in which the pivoted coil oscillates, said Helmholtz coil means being disposed in planes parallel with the axis of oscillation of said pivoted coil on either side thereof, means in circuit with the amplifier means and the pivoted coil for passing through said pivoted coil the non-rectified portion of the output current of said amplifier means, and indicator means in the Helmholtz coil circuit for indicating a current value capable of producing a neutralizing field necessary for just maintaining the pivoted coil in oscillation by the reaction of the current passed therethrough with the resultant of the magnetic field under measurement with the neutralizaing field produced by the Helmholtz coil means.

2. The system of claim 1, having second amplifier means in circuit with the oscillating coil and the amplifier means energized by the photo-electric element for amplifying the non-rectified portion of the current passed through said oscillating coil.

3. A system for magnetic field measurements, comprising a coil, means pivoting said coil for oscillation in said field, a light source, a photo-electric element, optical means carried by the coil for varying the illumination of the photo-electric element by the light source, and thereby also the current output of said element, proportionally to the oscillation of the coil, amplifier means energized by the output of the photo-electric element, rectifier means energized by the output of the amplifier means for rectifying a portion of the output current of said amplifier means, means in circuit with said coil and the output of said amplifier means for passing through said coil a non-rectified portion of said amplifier output current, second amplifier means in circuit with said rectifier means for amplifying the direct current output of said rectifier means, said second amplifier means having grid bias control means energized by the direct current output of the rectifier, Helmholtz coil means energized by the direct current output of the second amplifier means for neutralizing the magnetic field in which the pivoted coil oscillates, said Helmholtz coil means being disposed in planes parallel with the axis of oscillation of said pivoted coil on either side thereof, and indicator means in the Helmholtz coil circuit for indicating a current value capable of producing a neutralizing field necessary for just maintaining the pivoted coil in oscillation by the reaction of the current passed therethrough with the resultant of said magnetic and said neutralizing fields.

CHARLES H. FAY.

REFERENCES CITED

The following references are of record in the file of this patent:

UNITED STATES PATENTS

| Number | Name | Date |
|---|---|---|
| 1,863,415 | Rieber | June 14, 1938 |
| 1,938,184 | Kwartin | Dec. 5, 1933 |
| 2,123,045 | Hoare | July 5, 1938 |
| 2,147,492 | Meade, Jr. | Feb. 14, 1939 |
| 2,151,627 | Vacquier | Mar. 21, 1939 |
| 2,364,474 | Rich | Dec. 5, 1944 |
| 2,406,870 | Vacquier | Sept. 3, 1946 |
| 2,420,580 | Antes | May 13, 1947 |